July 14, 1964

H. W. RITCHEY ETAL 3,140,584

STEERING DEVICE FOR ROCKET-POWERED VEHICLES

Filed May 7, 1959

2 Sheets-Sheet 1

INVENTORS
HAROLD W. RITCHEY
BY ALLAN E. WILLIAMS
CHARLES S. ROBERTS

United States Patent Office 3,140,584
Patented July 14, 1964

3,140,584
STEERING DEVICE FOR ROCKET-POWERED VEHICLES
Harold W. Ritchey, Huntsville, Ala., Allan E. Williams, Newark, Del., and Charles S. Roberts, Brigham City, Utah, assignors to Thiokol Chemical Corporation, Bristol, Pa., a corporation of Delaware
Filed May 7, 1959, Ser. No. 811,760
4 Claims. (Cl. 60—35.55)

This invention relates to the steering of rocket-powered vehicles and more particularly to a rocket motor having a discharge nozzle mounted for tilting movement relative to the longitudinal axis of the rocket motor, whereby the direction of thrust of the gas being discharged from the rocket motor can be varied to steer a vehicle incorporating the motor.

One of the principal problems that has been encountered in the development of rocket-powered vehicles is the problem of providing adequate means for steering the vehicle during flight. Several general approaches to this problem have been previously proposed. Thus it has been suggested that the entire rocket motor be pivotally mounted in the vehicle so that it can be tilted relative to the axis of the vehicle to change the thrust vector. It has also been suggested that heat-resistant vanes be positioned within the discharge portion of the nozzle and mounted so that they can be tilted to change the thrust vector of the motor. In accordance with a third proposal, the rocket motor is provided with an articulated nozzle section which can be tilted with respect to the motor casing to change the direction of the thrust. It has been found that each of these general approaches presents special problems that have to be solved and no completely satisfactory solution has been found.

Figure 1:
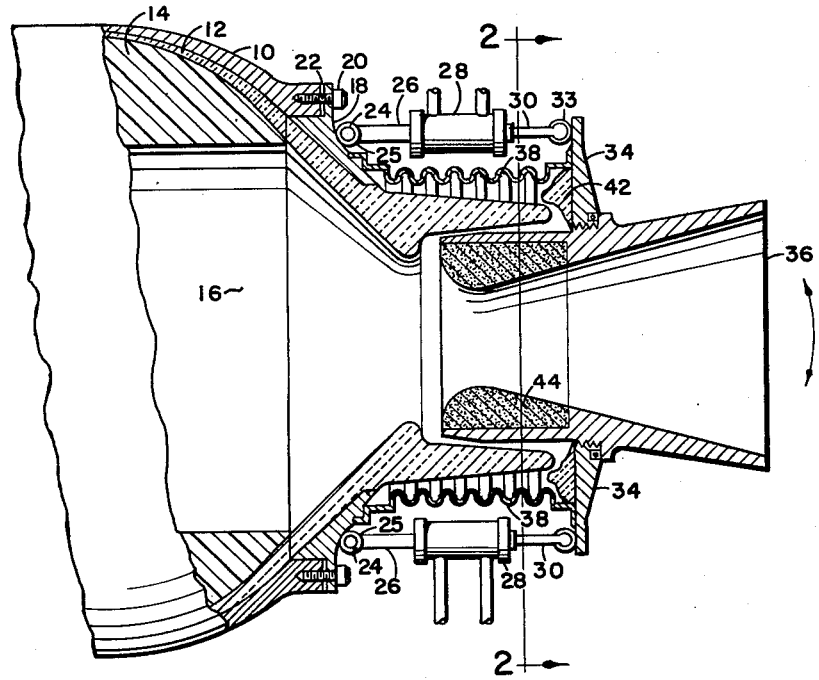
Figure 2:
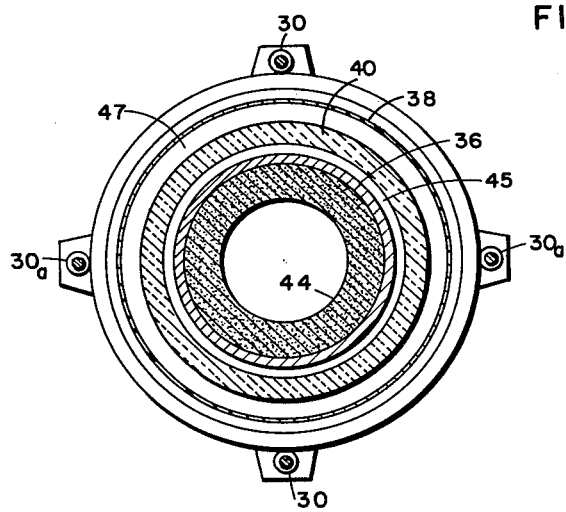
Figure 3:
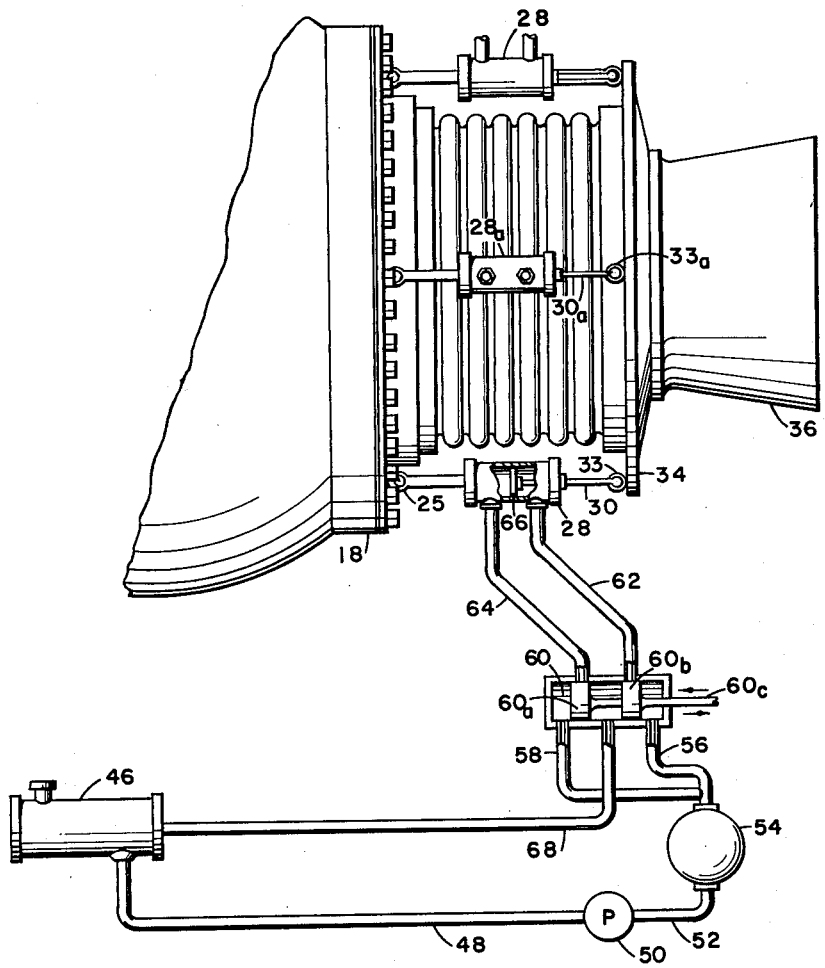

The present application is particularly concerned with the third of these approaches, that is, with the use of an articulated nozzle section. It is evident that when such a movable nozzle is used, one problem that arises is the provision of an adequate seal between the movable nozzle and the casing of the motor. It is accordingly an object of the present invention to provide a novel and improved type of seal for sealing a tiltable nozzle to the casing of a rocket motor. It is another object of the invention to provide means for thermally protecting such a seal against the action of the hot gases that flow through the nozzle. Other objects of the invention will be in part obvious and in part pointed out hereinafter in the following description and annexed drawings wherein:

FIGURE 1 is a partial vertical axial section of the aft portion of a solid-propellant rocket motor with hydraulic cylinders in elevation to show part of the main propellant charge, the interior of the tiltable discharge nozzle and the flexible tube connecting said discharge nozzle to the cylindrical casing of the rocket motor;

FIGURE 2 is a transverse section taken along line 2—2 of FIGURE 1 to show the discharge nozzle, the plastic liner of the rocket motor and the flexible tube; and, FIGURE 3 is a side elevation of the aft end of the rocket motor with a diagrammatic illustration of the hydraulic actuating means for tilting the discharge nozzle relative to the central longitudinal axis of the cylindrical casing of the rocket motor.

Referring now to FIGURE 1 the rocket motor shown has a cylindrical metal casing 10 lined with a plastic liner 12 through which a body of solid propellant 14 is bonded to the casing 10. The propellant body 14 has formed therein a passageway 16 wherein combustion gases form upon ignition of the interior surface of the propellant 14. An igniter to initiate combustion of the solid propellant 14 is generally located in the forward portion of the rocket motor; hence, the igniter is not shown in the accompanying drawings which illustrate only the rear portion of the motor. The cylindrical metal casing 10 is connected to an annular adapter 18 secured by bolts 20 to the casing 10 with a gasket 22 between adapter 18 and casing 10. The annular adapter 18 has mounted on its exterior surface a socket 24 of a ball and socket joint 25 by means of which a cylinder arm 26 of a hydraulic cylinder 28 is connected to the adapter 18. The piston rod 30 of the hydraulic cylinder 28 is secured by another ball and socket joint 33 to a flange 34 positioned almost at the midpoint of the exterior surface of the tiltable discharge nozzle 36. Three additional cylinders 28, only one of which is shown, are used to effect the tilting of discharge nozzle 36. The discharge nozzle 36 is also connected to the annular adapter 18 by a tubular bellows 38. The annular adapter 18 surrounds in part an extension 40 of the plastic liner which extends rearwardly to a position almost adjacent to an annular plastic baffle 42 secured to the inner surface of the flange 34. The extension 40 cooperates with baffle 42 to provide a baffle assembly that prevents direct incidence of the hot combustion gases on the flexible tube 38. The discharge nozzle 36 is in the form of a flared cylinder with a graphite insert 44 secured to its another inner surface to define the throat of the nozzle.

Referring now to FIGURE 2, a transverse section along the line 2—2 of FIGURE 1 is shown. The discharge nozzle 36 has the graphite insert 44 secured to the inner surface thereof. The annular space 45 represents the spacing between the nozzle 36 and the extension 40 of the plastic liner 12. The extension 40 which is a part of the baffle assembly need not be an integral part of the liner 12 but can be a separate element secured to the casing 10 by the adapter 18. The flexible tube 38 is separated from the outer surface of the extension 40 by space 47. The piston rods 30 of hydraulic cylinders 28 are shown in section near the periphery of FIGURE 2. Thus the cylinders 28 from the location of the piston rods 30 are indicated to be equally spaced about the periphery of the flange 34 and the annular adapter 18 so that the discharge nozzle 36 can be appropriately tilted to achieve any desired thrust vector within, of course, a maximum angle limited by the mechanical dimensions and spacings of the discharge nozzle 36, extension 40 of the plastic liner 12 and the annular plastic baffle 42.

FIGURE 3 shows a pressure-operated system of the hydraulic type for tilting the nozzle relative to the longitudinal axis of the casing 10. A supply tank or reservoir 46 containing hydraulic fluid is connected through conduit 48 to pump 50 from which the fluid is pumped through conduit 52 into accumulator 54. From here it passes through conduits 56 or 58 into a slide valve chamber 60 which contains two pistons 60a and 60b mounted on a common piston rod 60c. From the valve chamber 60, the fluid flows through either conduit 62 or 64 depending upon the position of its pistons to enter the pressure-tight hydraulic cylinder 28, which is at one end universally attached by means of ball and socket joint 25 to the annular adapter 18 of the motor in the manner shown in FIGURE 3. A piston 66 is slidable in cylinder 28 and is attached by means of piston rod 30 to ball and socket joint 33 on the flange 34 of the nozzle 36. A return pipe or conduit 68 connects the center of valve chamber 60 to tank 46.

A solid propellant rocket motor can be readily guided during its flight with the apparatus combination of the invention. To initiate flight of the rocket motor the solid propellant is ignited by igniter means well known in the art. The ignited propellant by combustion produces gases which are expelled by the internal pressure developed within the combustion chamber and discharged outwards from the discharge nozzle 36 to provide the thrust. The direct incidence of the combustion gas upon the flexible tube 38 is prevented by the baffle assembly which comprises the plastic liner extension 40 and the annular plastic baffle 42. The steering of the rocket motor in flight is achieved by tilting the discharge nozzle 36 relative to the longitudinal axis of the cylindrical casing, thus developing a moment arm of thrust perpendicular to the longitudinal axis of the rocket motor. The tilting of the discharge nozzle can be actuated for example by the hydraulic system shown in FIGURE 3.

This hydraulic system operates in the following manner:

As the double-piston slide 60a, 60b and 60c is moved to the left, conduits 56 and 62 communicate with one another and conduits 58 and 64 also communicate with one another. Conduit 58, however, is blocked by piston 60a. The hydraulic fluid from accumulator 54 flows, by means of connected conduits 56 and 62, into cylinder 28 on the piston rod side of piston 66. This flow moves piston 66 to the left and forces fluid from the opposite side of piston 66 out of cylinder 28 through conduit 64, valve 60 and conduit 68 back into supply tank 46. Movement of double-piston slide 60a, 60b and 60c to the right in FIGURE 1 results in communication between conduits 58 and 64 and between conduits 62 and 68. Conduit 56 is blocked by piston 60b. This results in a hydraulic force on piston 66 to cause its movement to the right in FIGURE 3. This movement forces the hydraulic fluid from cylinder 28, on the piston rod side of piston 66, out through conduit 62, valve 60 and conduit 68 back into the supply tank. Intermediate positions of the double-position slide within valve chamber 60 provide both control of the rate of flow of hydraulic fluid through the system to move piston 66 slowly or rapidly and of the position of the piston 66 within hydraulic cylinder 28. This movement of piston 66 and its attached rod 30 causes nozzle 36 to tilt to a considerable extent in the vertical plane relative to the longitudinal axis of the rocket motor.

A similar hydraulic actuation system operates hydraulic cylinder 28a to tilt nozzle 36 in the same manner as previously described but in a plane substantially ninety degrees to the motion induced by cylinder 28 and its related parts. Pistin rod 30a is connected to ball and socket joint 33a located on flange 34. Joint 33a is at a position ninety degrees along the flange 34 from the position of joint 33. A separate valve chamber of the type shown as valve chamber 60 is connected to cylinder 28a and provides independent operation of cylinders 28 and 28a. A similar hydraulic actuation system operates each of the other two hydraulic cylinders, one of which is not shown in FIGURE 3 but is located opposite to cylinder 28a. By proper manipulation of the several hydraulic actuation systems, the nozzle can be tilted to any position within a conical space determined by the mechanical separation and physical dimensions of the nozzle 36 and the extension 40.

The actuation of the hydraulic cylinders as described above can be manual when the rocket motor is used to propel a manned flight vehicle or in response to predetermined signals in an unmanned vehicle.

The plastic liner and baffle means referred to above can be of any substance which can withstand the very high temperatures of the combustion gases. Representative of such a substance is a polysulfide rubber filled with carbon black and magnesium oxide.

We claim:

1. A rocket motor comprising, in combination, an elongated plastic lined cylindrical casing having an opening at one end thereof, said plastic lining extending beyond said casing and defining a discharge end, a tiltable discharge nozzle generally aligned with the central longitudinal axis of said casing, the anterior portion of said discharge nozzle being suspended within said discharge end, means for suspending said tiltable discharge nozzle in said discharge end out of contact with the extended plastic lining except when in extreme tilted position, said suspending means interconnecting said casing and nozzle and comprising (1) a flexible tube exterior to said extended plastic lining, and (2) nozzle actuating means adapted to tilt said nozzle relative to said axis of said casing, and annular baffle means disposed adjacent to said discharge end on the exterior surface of said nozzle and adjacent to the interior surface of said flexible tube, whereby hot gases generated in said rocket motor are deflected from direct incidence on said flexible tube by said extended plastic lining and said annular baffle means.

2. A rocket motor as in claim 1 wherein said flexible tube is a tubular bellows.

3. A rocket motor as in claim 1 wherein said nozzle actuating means comprise a plurality of hydraulic actuating means.

4. A solid propellant rocket motor comprising, in combination, an elongated plastic lined cylindrical casing having an opening at one end thereof, said plastic lining extending beyond said casing and defining a discharge end, a tiltable discharge nozzle generally aligned with the central longitudinal axis of said casing, the anterior portion of said discharge nozzle being suspended within said discharge end, circumferential flange means secured to the external surface of said nozzle, means for suspending said tiltable nozzle in said discharge end out of contact with said extended plastic lining except when in extreme tilted position, said suspending means comprising (1) a tubular bellows exterior to said extended plastic lining and interconnecting said casing and said flange means and (2) hydraulic means connected between said casing and said nozzle and exterior of said bellows tube and adapted to tilt said nozzle relative to said axis of said casing, and baffle means disposed on the interior surface of said flange means, whereby hot combustion gases generated by combustion of said solid propellant are deflected from direct incidence on said tubular bellows by said extended plastic lining and said baffle means.

References Cited in the file of this patent

UNITED STATES PATENTS

| 1,821,274 | Plummer | Sept. 1, 1931 |
| 2,470,989 | Keller et al. | May 24, 1949 |
| 2,613,087 | Alford | Oct. 7, 1952 |
| 2,616,728 | Pitt | Nov. 4, 1952 |
| 2,746,243 | Pitt et al. | May 22, 1956 |
| 2,835,107 | Ward | May 20, 1958 |
| 2,936,185 | Olsen et al. | May 10, 1960 |

FOREIGN PATENTS

| 600,397 | Great Britain | Apr. 7, 1948 |
| 697,721 | Great Britain | Sept. 30, 1953 |